United States Patent [19]

Rooth

[11] Patent Number: 5,621,733
[45] Date of Patent: Apr. 15, 1997

[54] PACKET DATA NETWORK

[75] Inventor: Nils K. J. Rooth, Trångsund, Sweden

[73] Assignee: Telefonaktiebolaget L M Ericsson, Stockholm, Sweden

[21] Appl. No.: 161,466

[22] Filed: Dec. 6, 1993

[30] Foreign Application Priority Data

Dec. 14, 1992 [SE] Sweden .................... 9203762

[51] Int. Cl.⁶ .................................. H04J 3/24
[52] U.S. Cl. ........................... 370/94.1; 370/94.2
[58] Field of Search .................. 370/60, 94.1, 94.2, 370/110.1, 58.1–58.3, 60.1, 85.13, 85.5, 85.12, 85.15

[56] References Cited

U.S. PATENT DOCUMENTS

| | | | |
|---|---|---|---|
| 4,566,095 | 1/1986 | Devault et al. | 370/60 |
| 4,651,318 | 3/1987 | Luderer | 370/94.1 |
| 4,701,906 | 10/1987 | Ransom et al. | 370/60 |
| 4,766,590 | 8/1988 | Hamada et al. | 370/56 |
| 4,935,922 | 6/1990 | Wicklund et al. | 370/60 |

FOREIGN PATENT DOCUMENTS

| | | |
|---|---|---|
| 255767 | 2/1988 | European Pat. Off. . |
| 420493 | 4/1991 | European Pat. Off. . |
| WO92/10898 | 6/1992 | WIPO . |

Primary Examiner—Douglas W. Olms
Assistant Examiner—Ajit Patel
Attorney, Agent, or Firm—Burns, Doane, Swecker & Mathis, L.L.P.

[57] ABSTRACT

A method and a packet network in which a transmitting user unit in the network transmits an information sequence either to one selected receiving user unit or commonly to a selected number of receiving user units. An information sequence is a data cell that is divided into a header and an information-carrying part. The data cell header includes a bit configuration that represents a destination address, while the information-carrying part includes a bit configuration that represents relevant information. The bit configuration in the data cell header is interpreted in accordance with the logic value of an indicated status bit, which is included in a bit field separate from the bit field that accommodates the actual address-dependent bit configuration. The logic value of the status bit is category indicative and determines whether a received destination address is interpreted as a directly coded address pertaining to a single receiving user unit or as a channel-number-coded address pertaining to a number of receiving user units.

13 Claims, 2 Drawing Sheets

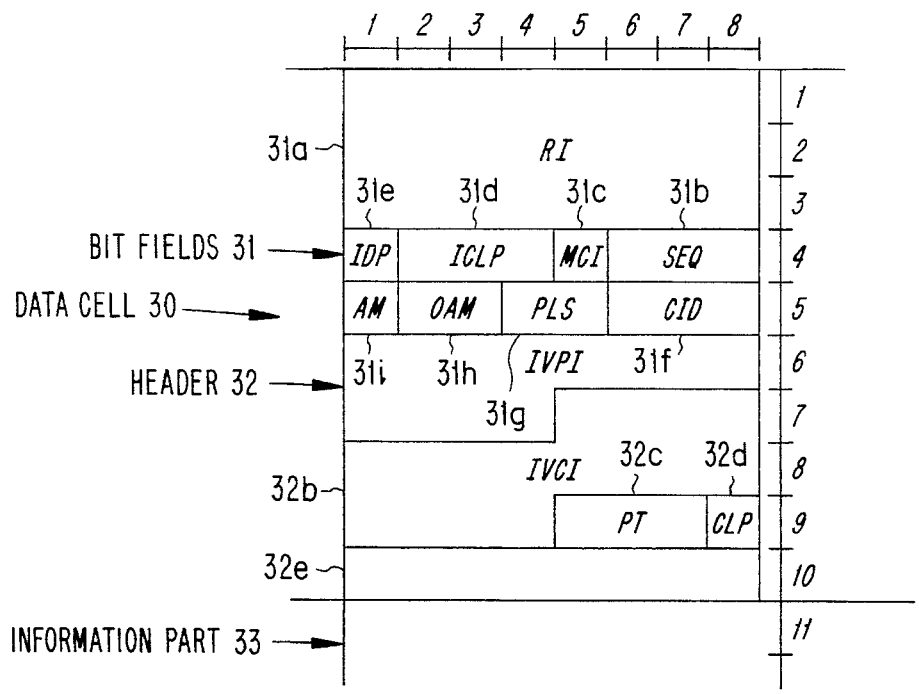
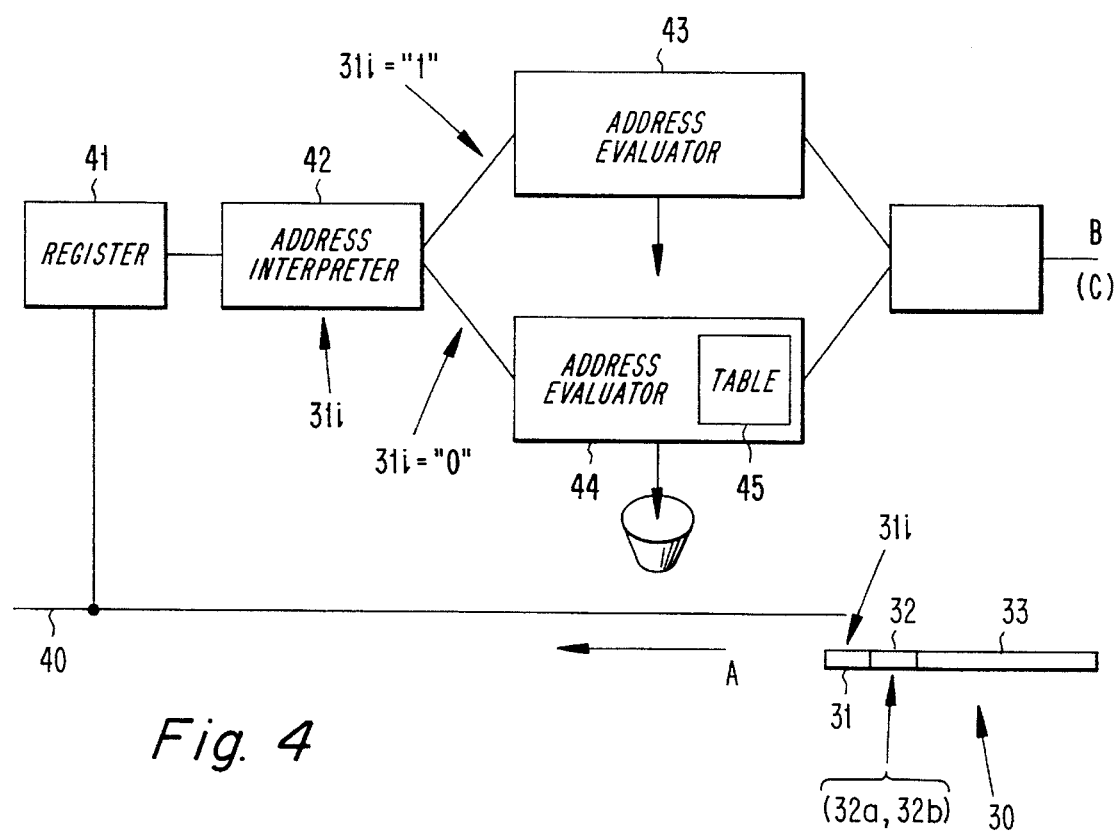

PACKET DATA NETWORK

TECHNICAL FIELD

The present invention relates to and is intended for application within a packet data network in which a transmitting user unit in the network is intended to transmit an information sequence either to solely one selected receiving user unit in the network or to a commonly receiving selected number of user units in said network.

The invention primarily relates to a method of carrying out the aforesaid procedures and secondarily, to a packet data network adapted to carry out the method.

The invention is also based on the requisite exchange of information between the user units of the packet network being effected in the form of data cells or data packets, where each data cell may advantageously be a standardized data cell with regard to the number of bit positions within a bit field and the distribution of these bit positions, and that the data cell is therewith divided into a specified header and a specified information-carrying part.

The header includes distributed bit fields and is allocated bit configurations which represent, among other things, a destination address, while the information part includes distributed bit fields and is allocated bit configurations which represent relevant information, among other things.

When a user unit forming part of the packet network and belonging to the system wishes to transmit one and the same information sequence in the form of a data cell to a plurality of selected receiving user units, the transmitting user unit allocates to the bit configuration representative of the destination address in the header a common identity which is representative of and significant to each selected receiving user unit, wherein when receiving said data cell each selected receiving user unit will react to accept the whole of said data cell or at least its information part.

The invention is also a development of the procedure in which when a user unit that forms part of the packet network and belongs to the system wishes to transmit an information sequence in the form of a data cell to solely one receiving user unit, the transmitting user unit allocates to the bit configuration representative of the destination address in the header an identity which is significant solely to the selected receiving user unit, wherein when receiving the data cell the single selected receiving user unit will react to accept the whole of the data cell or at least its information-carrying part.

DESCRIPTION OF THE PRIOR ART

There are known to the art several different examples of packet networks which comprise a plurality of user units and in which the signal information or the information sequence is particular and standardized and is formed by one or more data cells, each having a CCITT standardized, constant length of 53 octettes, of which 5 octettes are used for a header which includes, among other things, a virtual destination address, and 48 octettes which are used to carry information, i.e. a so-called information-carrying part.

A packet network which includes packet switches and which forms part of a telecommunication system is known per se and the present invention obtains particular suitable application when the packet switches used are constructed on an ATM system (Asynchronous Transfer Mode) and where the data cells used are allocated internally in the switch equipment a special structure of extended length in relation to standardized data cells, for instance a length extended by 5 octettes.

Also belonging to the earlier state of the art is thus a packet network in which each user unit is allocated a respective identity and in which the addressing procedure is based on the selection of the destination address in the data cell similar to the identity of the receiving user unit.

This application requires only one simple decoder for each user unit.

In this regard, it is known that it is impossible to address one and the same data packet or data cell to several receiving user units at one and the same time in a system of this kind.

It is also known to create in a packet network conditions which will enable one and the same packet to be transferred to several receiving user units simultaneously.

In this regard, it has been proposed to use some form of channel number as the destination address.

In the case of earlier known packet networks, the use of channel numbers has made it necessary to provide each user unit with a table which contains information relating to the channel numbers that are intended precisely for a particular user unit.

It is therefore obvious that such a table must be updated each time the channel numbers in use are changed.

In the case of large systems, experience has shown that when a packet network requires a the provision of a table for each user unit, or at least for each receiving user unit, the tables become unmanageably large.

It can be mentioned here that each data cell or data packet has different bit fields, each representing different functions and carrying different information, as a result of allotting the bit positions within respective fields a bit configuration corresponding to desired function and information.

The most relevant prior art is disclosed in WO-A1-192/10898. This publication discloses a system capable of providing a "multicast" function, i.e. a function in which one and the same information content can be sent by a transmitter to all receivers, and a "unicast" or a "direct" function, i.e. a function in which information content can be sent by a transmitter to a selected receiver, all in accordance with the basic concepts of the present invention.

According to the invention, a distinction is made between a packet intended for "multicast" and a packet intended for "unicast" by inserting additional bits.

Reference is made to a four-port-system 10, where each of four inputs shall be capable of connection to each of four outputs, with the aid of switch means 20.

To this end, the switch means 20 includes four ports 0–3, where each port coacts with a control unit 300–303 which functions as an interface between different data formats and the data format required by the switch means 20.

Each of the control units 300–303 has at least two connections to the switch means 20, i.e. a "multicast" addressing connection and a "unicast" addressing connection in addition to the unit 300, where both of these shall have the same physical line and are comprised of the port "0".

The control units 301–303 are connected to "unicast" addressable ports by connections 25 and to "multicast" addressable ports by connections 28.

Packets incoming to each of the units 300–303 are evaluated and an internal address part (13) for the switch means (20) is generated in the units 300–303 in accordance with the addressing part (Header) of the received packet.

This address part (13) is generated in accordance with a table look-up. This table indicates whether the address part (13) shall be provided with a "unicast" or "multicast" indication and a bit instruction corresponding to the choice made.

It shall be noted in this regard that the switch means 20 is constructed to point to a port 1, 2 and 3 corresponding to an indicated control unit 301–303 in the case of a "unicast" indication.

In the case of a "multicast" indication, a particularly adapted "multicast" port is indicated, namely the port "0".

Of necessity this arrangement requires the use of a selected port "0" each time the "multicast" function is selected, this port being connected to a separate (physical) communication path (28) which is adapted precisely for this function.

Each of the control units 300–302 notes the packet occurring on the "multicast" connection 28 and read this packet solely when coordination is found between the sum of the units and the selected bit positions in the "multicast" address.

Thus, all control units are connected to the "multicast" function through the separate, inserted communication path (28).

If no control unit wishes to take part in the "multicast" function, there is found in each control unit an internal table which must be read and when necessary block reception.

DISCLOSURE AND CONSIDERATIONS RELATED TO THE PRESENT INVENTION

Technical Problems

When considering earlier known packet networks together with known telecommunication systems, and then in particular telecommunication systems of the kind defined in the introduction and provided with packet switches, it will be seen that a technical problem resides in the ability to create conditions with relatively simple measures that will reduce the necessary hardware and which will also simplify the necessary signalling procedure within the user units and the switching equipment respectively.

When considering the limited number of positions found in the bit fields in a data cell, and when considering the strict distribution with regard to the form of the different bit fields and the number of bit positions and in particular the structure of the addressing field, it will be seen that a technical problem is one of enabling the addressing possibilities to be increased with the aid of simple means.

Another technical problem is one of realizing the significance of using in a data cells which has already strict distribution a selected bit position which is separate from those bit positions that are normally used for addressing purposes to point-out one of two addressing categories of which a first addressing category points to an interpretation of the address-indicating bit positions according to which said positions apply to a number of selected user units and indicate common transmission of information to these user units.

In this regard, a technical problem is one of finding within a specific, clearly defined data cell having bit positions and bit fields which are well defined for different functions, a bit position and a bit field which are well suited for addressing category selection and which lie outside those bit positions that are normally used for addressing purposes and which therewith decisively increase the addressing possibilities within the standard format of the data cell.

Another technical problem is one of creating conditions with the aid of simple means which will offer a table to respective user units, even in large systems, but with a limited, readily handled number of channel numbers inserted in the table.

It will also be seen that a technical problem is one of realizing the significance of being able to restructure in a special manner the bit configuration within the bit field of the data cell applicable to but located outside the actual destination address, so that a bit position selected by the transmitting user unit will indicate clearly that a transmitted information sequence or data cell is intended solely for one single selected receiving user unit belonging to the network, or that a transmitted information sequence is intended to be received commonly by a selected number of receiving user units belonging to said network.

Another technical problem in the present connection is one of realizing the significance of supplementing a destination address with a status bit which belongs to the destination address but which is separated from the destination-address bit field and points to a category, this status bit disclosing how the virtual destination address shall be interpreted. For instance, when the status bit is a logic "1", the address is interpreted as a direct coding of the identity of the receiver, whereas when the status bit is a logic "0", the address is interpreted as a general channel number which shall be translated with the aid of a table.

It will also be seen that a technical problem is one of realizing that the requisite tables belonging to the user units can be made much smaller than in the general case of the earlier known techniques, when the number of information transmissions to a selected user unit is much larger than the number of information transmissions common to a selected number of user units.

Solution

With the intention of solving one or more of the aforesaid technical problems, the present invention provides a method for transmitting from a transmitting user unit belonging to a packet network, such as a packet network forming part of a telecommunication system, an information sequence in the form of a data cell, either solely to a single selected receiving user unit in the network or commonly to a selected number of receiving user units in said network.

The information content between transmitting user unit and receiving user unit is comprised of a data packet or a data cell which is comprised of a header and an information-carrying part, where the header includes one or more bit fields which represent a virtual destination address among other things, and the information part includes a bit field which represents relevant information among other things, wherein prior to transmitting said data cell solely to one receiving user unit a transmitting user unit allocates an identity, i.e. a direct coded address, to the bit configuration within the field representative for the destination address in said header, said identity being significant solely to the single selected receiving user unit, wherein upon receipt of said data cell the receiving, selected user unit reacts to accept the data cell or at least its information part.

The present invention expands upon this procedure insofar that prior to transmitting a data cell for common receipt in a selected number of receiving user units, a transmitting user unit allocates an identity which is common to said transmission, via direct addressing to each selected receiving user unit, whereafter the transmitting user unit transmits a data cell in which the bit configuration of the header within said field represents, among other things, the common destination address in the form of a channel number coded address, wherein upon receiving the data cell each receiving user unit selected by said transmitting user unit will react to accept the data cell as a common transmission and receive data cell or at least its information content in common with other receiving user units.

According to the present invention, the address-dependent bit configuration within the addressing field of the data-cell header shall be interpreted in accordance with the logic value of an indicated status bit; in that the indicated status bit is selected from a bit field which is separate from the bit field that includes said address-dependent bit configuration; and in that the logic value of the indicated status bit is comprised of a category indication and therewith determines how a received destination address shall be interpreted in the case of a first logic value, which is a direct coded address, and in the case of a second logic value, which is a channel number coded address.

The invention also relates to a packet network having a connection that can be used for a plurality of user units and including information exchange or information transmission between two or more user units with the aid of one or more data cells, each comprising a header and an information part among other things, where the header includes a bit configuration within the addressing field representing, among other things, a destination address, and an information part includes within the information field a bit configuration which represents relevant information, wherein each user unit is allocated an identity significant thereto.

According to the present invention, the destination-address-dependent bit configuration of the data cell header is intended to be interpreted by first means in accordance with an indicated status-bit logic value which at a given first value shall be interpreted so as to decode the given destination address as a direct coding of an identity allocated to a receiving user unit, and which at another specific value shall be interpreted so as to decode the given destination address as a channel number belonging to a plurality of receiving units.

The data cell shall be comprised of an ATM data cell. The indicated status bit seizes one or more bit positions located outside the addressable section or field in the header.

Advantages

Those advantages primarily afforded by an inventive method and an inventive packet network are that the destination address of the data cell has been structured so that in addition to the bit positions of the addressing field, the data cell also includes at least one category-selecting status bit which is separate from the addressing bit positions of the addressing field and which denotes how a relevant address shall be interpreted. When such a status bit is used, its value shall either be interpreted as a direct coding of the identity of the receiver or as a general channel number which shall be translated with the aid of a table belonging to respective user units.

This results in an expansion of the addressing possibilities.

The primary characteristic features of an inventive method are set forth in the characterizing clause of the following claim 1, while the main characteristic features of an inventive packet network are set forth in the characterizing clause of the following claim 2.

BRIEF DESCRIPTION OF THE DRAWINGS

A number of exemplifying embodiments at present preferred and having features significant to the present invention will now be described in more detail with reference to the accompanying drawings, in which

FIG. 3 illustrates an example of a bit configuration within different bit fields, among other things for the header of a data cell; and FIG. 4 is a block schematic which illustrates in a highly simplified manner the means required in each user unit to provide the possibility of evaluating and interpreting the bit configuration of a selected bit position in the data cell.

BEST MODES OF CARRYING OUT THE INVENTION

Figure 1:
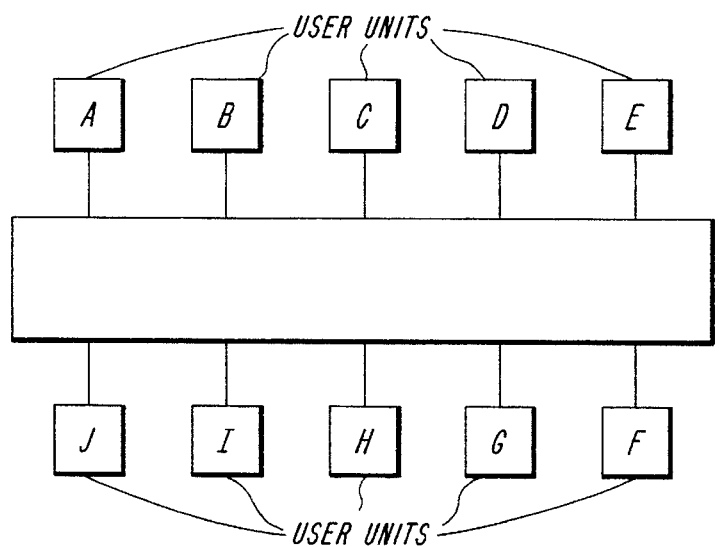
FIG. 1 illustrates the principle construction of a packet network in which a plurality of user units are mutually connected in a ring structure.

Shown in FIG. 1 is a packet network in which a plurality of user units A, B, C . . . J are mutually connected to form a ring structure. It is assumed that each unit is able to transmit or to receive one or more information sequences in the form of data cells.

The manner in which the packet network operates in accordance with the present invention will be described in more detail in the following.

Figure 2:
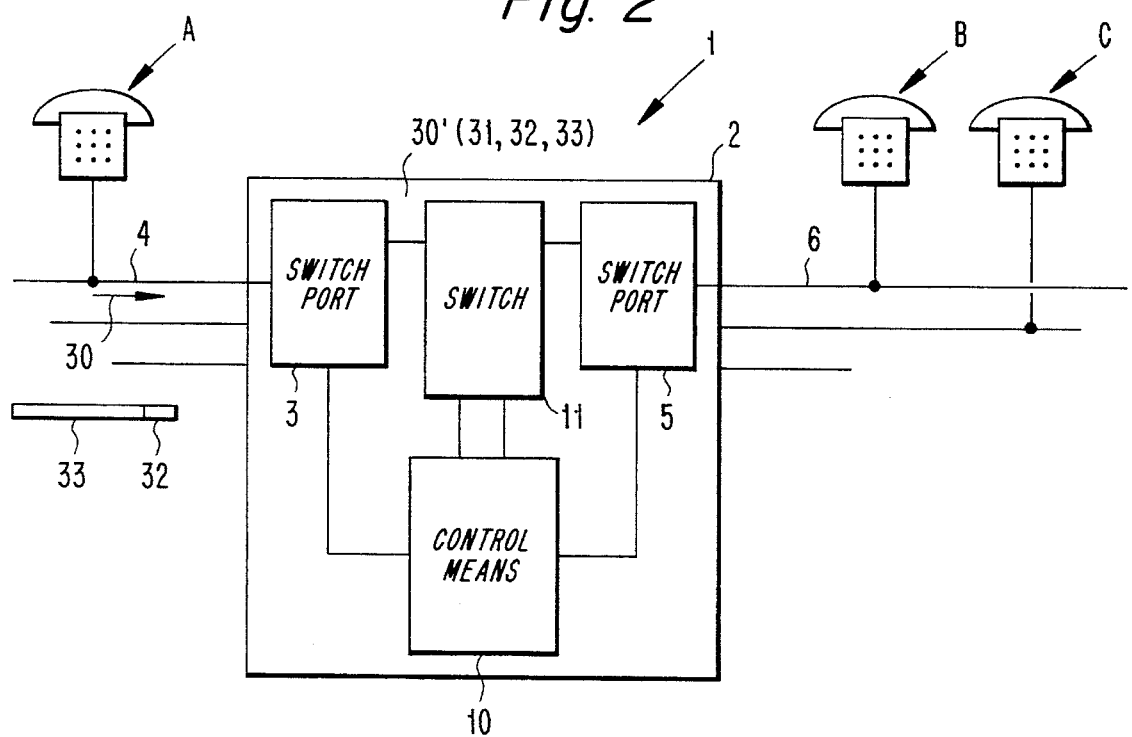
FIG. 2 illustrates the principle construction of a packet switch included in a telecommunication system in which the characteristic features of the present invention can be well applied.

FIG. 2 is a highly simplified illustration of ATM switch equipment 2 forming part of a telecommunication system 1.

The ATM technique is known to the art and consequently this technique will not be described in detail here, for the sake of simplicity.

A number of incoming links 4 are connected to the switch equipment 2 via first switch ports 3, while a number of outgoing links 6 are connected to the switch equipment 2 via second switch ports 5.

The switch equipment 2 includes control means 10 which includes a processor. The processor may alternatively be placed separate from the control means. The switch equipment further includes switching means 11 for connecting an incoming link 4 to an indicated outgoing link 6, where indication of the outgoing link 6 is initiated by signals in the form of one or more data cells appearing on the incoming link 4.

These switch-external data cells 30 have a CCITT standard, with 5 octettes in a header that contains a virtual destination address among other things, and 48 octettes in an information part that contains the actual information among other things, these data cells being dimensioned as standard ATM data cells.

The features or properties associated with the present invention are not limited solely to standardized switch-external data cells, but can also be readily applied to switch-internal data cells that derive from standardized data cells.

For this latter application, it is proposed in accordance with the invention that in a first port, additional information in the form of an additional bit configuration which presents different bit fields is supplied to a standardized switch-external data cell, and that these additional bits (5 octettes) are allocated a bit configuration, among other things in accordance with address information contained in the data cell header, which results in said additional bits being used solely internally in the switch equipment to control selected functions. These additional bits shall be removed in the second port 5.

FIG. 3 illustrates schematically the structuring of the bit fields 31 applicable to said additional bits that have been supplied to the data cell 30, having a header 32 and an information part 33, and thereby form a switch-internal data cell 30' outgoing from the first port 3.

A more detailed description of how these additional bit fields 31 that contain control information can be formed and utilized is given in Swedish Patent Application No. 92 03332-3 filed on the 9th Nov. 1992, and entitled "Distinguishing Connections".

FIG. 3 is intended to illustrate an example of how the bit positions can be distributed within a field or area 31 intended for the additional bits, and within a field or area 32 intended for the data cell header.

The positions 31a represent RI (Routing Information), the positions 31b represent SEQ (Cell Sequence Number), the positions 31c represent MCI (Multicast Indication), the positions 31d represent ICLP (Implicit Cell Loss Priority), the positions 31e represent IDP (Implicit Delay Priority), the positions 31f represent CID (Cell Identifier), the positions 31g represent PLS (Plane Select), the positions 31h represent OAM (Operation and Maintenance) and the position 31i represents AM (Address Mode).

The positions 32a represent VPI (Virtual Phase Identifier), the positions 32b represent VCI (Virtual Channel Identifier), the positions 32c represent PT (Payload Type) and the positions 32d represent CLP (Cell Loss Priority).

A study of the bit field distribution illustrated in FIG. 3 will show that the fields or the positions 32a and 32b primarily represent the addressing information and that the number of available addresses is limited by the specific number of available bit positions. Information stored in positions 32a and 32b is transformed to positions within the field 31.

In order to double the number of available addresses, there is used in accordance with the invention an additional bit position 31i (AM) whose value is intended to indicate the interpretive category of the address in the data cell.

The logic value of the bit positions 31i, or another indicated status bit, is thus category indicating and determines how a received destination address shall be interpreted. When the logic value has a first value, the address is interpreted as a directly coded address which belongs to one single receiving unit, whereas when the logic value has another value, the address is interpreted as being the same address as a channel-number-coded address belonging to a plurality of receiving units.

FIG. 4 is intended to illustrate that each user unit shall be connected to a common information carrier 40 via a register 41, such as a buffer register, irrespective of whether the user unit is included in a packet network constructed in accordance with FIG. 1 or in switch equipment 2 which is included in a telecommunication system according to FIG. 2.

The buffer register 41 is connected to an address interpreter 42 which is intended to detect the logic value in the position 31i (Address Mode).

Should the interpretation in the unit 42 indicate that the data cell has a direct address, the address is evaluated in a direct-address evaluating device 43 to establish whether or not the direct address is intended for the user unit B concerned.

If the device 43 ascertains that the direct address received is correct and applicable, a switch is made from the connection 40 to the user unit B which then receives the data cell. Otherwise, the data cell is rejected in an earlier known manner.

Should the address-interpreting unit 42 detect that the data cell carries a channel-number-coded address, this address is sent to a device 44 which evaluates channel-number-coded addresses and which looks-up a table 45 in order to establish whether or not the channel number is found in the table.

If the channel number in question is not stored in the table, the data cell is rejected in an earlier known manner. If the channel number is stored in the table 45, a switch is made so that the data cell can pass through the device 44 and to the user unit B.

The significant features of the inventive method and the manner in which the packet network operates will now be described with reference to FIGS. 1 and 2.

The invention is based on the concept of transmitting from a transmitting user unit A within a packet network or within switching equipment included in a telecommunication system an information sequence either to solely one selected receiving user unit B belonging to said network or to a selected number of commonly receiving user units B, C in said network.

The information sequence is comprised of a data cell that is divided into a header and an information-carrying part, wherein the header includes a bit configuration within different bit fields which represents, among other things, a destination address, and the information-carrying part includes a bit configuration which represents relevant information among other things, wherein when transmitting said data cell to solely one receiving user unit, the transmitting user unit allocates to the destination-address bit configuration in the header an identity which is significant solely to the selected receiving user unit, and wherein when receiving said data cell the selected receiving user unit B reacts in the aforedescribed manner to accept the whole of the data cell or at least its information part.

When using in a packet network according to FIG. 1 data cells which lack an additional bit configuration 31, the requisite difference between a direct address and a common address, via a channel-number-coded address, resides in a selected bit position which is preferably separate from the bit configurations 32a and 32b, whereas in the FIG. 2 embodiment the difference between a direct address and a channel-number-coded address will advantageously lie in solely the section 31i.

When transmitting data cells which are intended to be received commonly by a selected number of receiving user units B, C, the transmitting user unit A allocates to each selected receiving user unit B, C via a direct address, an identity which is common to all selected user units, this identity being received and stored in the device 44 which evaluates the channel-number-coded addresses, and particularly in the table 45 associated with the device 44.

The common identity is thus a channel-number-coded address.

When the transmitting user unit A then wishes to transmit a data cell which is common to each of the receiving user units B and C, the data cell header will exhibit a unique bit configuration which, among other things, represents the common destination address or the channel-number-coded address, wherein upon receipt of said data cell each selected receiving user unit B, C will react to accept the data cell or at least its information-carrying part.

The exemplifying embodiment shown in FIGS. 2 and 3 shows particularly that the address-dependent bit configuration pertaining to the data cell header shall be structured so that the logic value of an indicated status bit will show how a received destination address shall be interpreted.

In the case of a first logic value, the destination address shall be interpreted as a direct coded address, while in the case of a second logic value, the destination address shall be interpreted as a channel-number-coded address.

In each case, both with respect to the embodiment illustrated in FIG. 1 and the embodiment illustrated in FIG. 2, the bit configuration of the data cell, particularly with regard to the destination address, will be so structured that the logic value of an indicated status bit will determine how the destination address concerned shall be interpreted.

A decoded general channel number for each selected receiving user unit will require a transposition with the aid of a table associated with respective receiving user units, wherein the bit configuration representing the information-carrying part will be received by one or more user units, each adapted to receive the information over said general channel number.

In the case of a standardized data cell with bit positions solely within the regions 32 and 33, one (or more) bit position within the field 32e is used as a status bit, this field normally being a control field.

The region or area 33 will also include free fields or parts thereof which can be used as additional addressing bits or status bits.

It should be mentioned that the use of an additional status bit outside the addressing field will theoretically double the number of available addresses. Naturally, the number of available addresses will be further increased when two status bits are used.

By "common reception" is meant primarily the reception of one and the same data cell in several user units, which need not necessarily be synchronous reception in time.

When two status bits are used, the second status bit may be used to initiate the transmission of signals to all receiving units or to preselected units without previous addressing via available addressing fields in the data cell.

It will be understood that the invention is not restricted to the aforedescribed and illustrated exemplifying embodiments thereof, and that modifications and changes can be made within the scope of the inventive concept as illustrated in the following Claims.

I claim:

1. A method of transmitting an information sequence from a transmitting user unit in a packet network on a communication means or a connection either to solely one single selected receiving user unit in the network or commonly to a selected number of receiving user units in said network, said transmitted information sequence being comprised of one or more data cells, each comprising a header and an information-carrying part, wherein the header includes within a bit field a bit configuration which represents a final destination address, and the information-carrying part includes within a bit field a bit configuration which represents relevant information, wherein when transmitting a single user data cell which is to be received by solely one receiving user unit the transmitting user unit allocates to the bit-configuration for the final destination address in the header an identity which is significant solely to the single selected receiving user unit, wherein upon receipt of said single user data cell, the selected receiving user unit reacts to accept the single user data cell or at least its information-carrying part, wherein when transmitting a plural users data cell which is intended to be received by a plurality of selected receiving user units, the transmitting user unit allocates to the bit configuration representing the final destination address in the header an identity which is common and significant to the selected receiving user units, wherein upon receiving said plural users data cell each of said selected receiving user units reacts to accept the plural users data cell or at least its information-carrying part, wherein each user receiving unit is programmed to interpret a logic value of an indicated status bit as a category indication; the address-department bit configuration pertaining to each data cell header appearing on the communication means or connection is interpreted in each receiving user unit in accordance with the logic value of an indicated status bit so as to determine therewith how a received final destination address shall be interpreted, wherein, as a result of said programming of said receiving units, in the case of a first logic value each receiving user unit shall interpret the final destination address as a direct coding of an address which is pertinent to solely one receiving user unit and the information sequence in the data cell is therewith received solely in the receiving user unit corresponding to the indicated final destination address, and in the case of a second logic value the address is interpreted as a channel-number-coded address pertaining to a plurality of receiving user units and the information sequence pertaining to the data cell is therewith receiving in each of the receiving user units that correspond to the indicated final destination address.

2. The method of claim 1, wherein the transmitting user unit transmits at least one data cell to at least one receiving unit via a ring structure to which the user units are mutually connected.

3. A packet network having a connection which can be used by a plurality of user units and in which information is exchanged between two or more user units with the aid of one or more data cells, each comprising, a header and an information-carrying part, said header including within a bit field a bit configuration which is representative of a destination address, and said information-carrying part including within a bit field a bit configuration which is representative of relevant information, and wherein each user unit is allocated an identity, wherein each user unit is able to receive a status bit which is separate from the destination-address dependent bit configuration belonging to the data cell; in that each user unit is programmed to interpret the value of the status bit, which in the case of a given first value shall be interpreted as the given destination address decoded as a direct coding of an identity allocated to a single receiving user unit, and in the case of a second given value shall be interpreted so as to decode the given destination address as a common identity or an associated channel number allocated to a plurality of receiving units, wherein each user unit belonging to a multi-cast group arrangement includes a list containing a channel number for each group.

4. The packet network of claim 3, wherein the user units are mutually connected to form a ring structure.

5. A packet network, having a connection which can be used by a plurality of user units and in which information is exchanged between two or more user units with the aid of one or more data cells, each comprising, a header and an information-carrying part, said header including within a bit field a bit configuration which is representative of a destination address, and said information-carrying part including within a bit field a bit configuration which is representative of relevant information, and wherein each user unit is allocated an identity, wherein each user unit is able to receive a status bit which is separate from the destination-address dependent bit configuration belonging to the data cell; in that each user unit is programmed to interpret the value of the status bit, which in the case of a given first value shall be interpreted as the given destination address decoded as a direct coding of an identity allocated to a single receiving user unit, and in the case of a second given value shall be interpreted so as to decode the given destination address as a common identity or an associated channel number allocated to a plurality of receiving units wherein in the case of a coded channel number, there is required for each selected receiving user unit an evaluation with the aid of a table belonging to respective receiving user units, wherein the bit configuration representing the information-carrying part is received by each of the receiver units adapted to receive the information over said coded channel number.

6. A packet data network according to claim 5, wherein the data cell is an ATM data cell.

7. A packet data network according to claim 6, wherein the indicated status bit seizes one or more bit positions situated outside the standardized address-carrying section or field of the header of the ATM data cell.

8. A packet network having a connection which can be used by a plurality of user units and in which information is exchanged between two or more user units with the aid of one or more data cells, each comprising, a header and an information-carrying part, said header including within a bit field a bit configuration which is representative of a destination address, and said information-carrying part including within a bit field a bit configuration which is representative of relevant information, and wherein each user is allocated an identity, wherein each user unit is able to receive a status bit which is separate from the destination-address dependent bit configuration belonging to the data cell; in that each user unit is programmed to interpret the value of the status bit, which in the case of a given first value shall be interpreted as the given destination address decoded as a direct coding of an identity allocated to a single receiving user unit, and in the case of a second given value shall be interpreted so as to decode the given destination address as a common identity or an associated channel number allocated to a plurality of receiving units wherein the indicated status bit seizes one or more bit positions situated outside the standardized address-carrying section of field of the header of the ATM data cell.

9. A method of transmitting an information sequence from a transmitting user unit in a packet network on a communication means or a connection either to solely one single selected receiving user unit in the network or commonly to a selected number of receiving user units in said network, said transmitted information sequence being comprised of one or more data cells, each comprising a header and an information-carrying part, wherein the header includes within a bit field a bit configuration which represents a destination address, and the information-carrying part includes within a bit field a bit configuration which represents relevant information, wherein when transmitting a single user data cell which is to be received by solely one receiving user unit the transmitting user unit allocates to the bit-configuration for the destination address in the header an identity which is significant solely to the single selected receiving user unit, wherein upon receipt of said single user data cell, the selected receiving user unit reacts to accept the single user data cell or at least its information-carrying part, wherein when transmitting a plural users data cell which is intended to be received by a plurality of selected receiving user units, the transmitting user unit allocates to the bit configuration representing the destination address in the header an identity which is common and significant to the selected receiving user units, wherein upon receiving said plural users data cell each of said selected receiving user units reacts to accept the plural users data cell or at least its information-carrying part, wherein each user receiving unit is programmed to interpret a logic value of an indicated status bit as a category indication; the address-department bit configuration pertaining to each data cell header appearing on the communication means or connection is interpreted in each receiving user unit in accordance with the logic value of an indicated status bit so as to determine therewith how a received destination address shall be interpreted, wherein, as a result of said programming of said receiving units, in the case of a first logic value each receiving user unit shall interpret the address as a direct coding of an address which is pertinent to solely one receiving user unit and the information sequence in the data cell is therewith received solely in the receiving user unit corresponding to the indicated address, and in the case of a second logic value the address is interpreted as a channel-number-coded address pertaining to a plurality of receiving user units and the information sequence pertaining to the data cell is therewith receiving in each of the receiving user units that correspond to the indicated address, wherein when decoding the given destination address as an associated channel number, the user unit uses a list of channel numbers stored in the user unit.

10. A method of transmitting an information sequence, in a packet network having a plurality of user units, singly to a selected user unit or commonly to a selected number of user units, wherein the information sequence includes one or more data cells, each data cell including a header and information carrying part, wherein the header includes an address bit field representing a destination address and a status bit field indicating if the data cell is directly addressed to a single selected user unit or commonly addressed commonly to a number of selected user units, the method comprising the steps of:

allocating by a first user unit, to the status bit field, a bit configuration indicating if a data cell is directly addressed to user unit or commonly addressed to a number of user units;

transmitting the data cell from a first user unit to at least a second user unit;

receiving the data cell at the at least one second user unit;

interpreting the status bit to determine if the data cell is directly addressed or commonly addressed, wherein if the cell is directly addressed determining if the data cell address bit field is addressed to the at least one second user unit; and if the cell is commonly addressed, looking up the address in a table to determine if the data cell is commonly addressed to the at least one second user unit; and accepting the data cell if it is directly or commonly addressed to the at least one second user unit.

11. The method of claim 10, comprising the further step of rejecting the data cell if it is not directly or commonly addressed to the second user unit.

12. A packet network including a plurality of user units for the exchanging information by data cells, wherein each data cell includes a header and information carrying part, wherein the header includes an address bit field representing a destination address and a status bit field indicating if the data cell is directly addressed to a single selected user unit or commonly addressed to a number of selected user units the network, comprising:

a first user unit for allocating to the status bit field a bit configuration indicating if a data cell is directly addressed to user unit or commonly addressed to a number of user units;

means for transmitting the data cell from a first user unit to at least a second user unit;

at least one at least one second user unit for receiving a data cell including:

means for interpreting the status bit to determine if the data cell is directly addressed or commonly addressed;

means for determining if the cell address bit field is addressed to the at least one second user unit if the data cell is directly addressed;

means for determining if the data cell is commonly addressed to the at least one second user unit, wherein if the data cell is commonly addressed, the common address determining means looks up the address in a table to determine if the data cell is addressed commonly to the second user unit;

means for accepting the data cell if it is directly or commonly addressed to the second user unit.

13. The packet network according to claim 12, further comprising means for rejecting the data cell if it is not directly or commonly addressed to the second user unit.

* * * * *